United States Patent [19]

Smetana

[11] Patent Number: 4,739,997

[45] Date of Patent: Apr. 26, 1988

[54] PRESSURIZED BEARING SEAL ASSEMBLY

[75] Inventor: Michael A. Smetana, Lewiston, Id.

[73] Assignee: Potlatch Corporation, San Francisco, Calif.

[21] Appl. No.: 904,688

[22] Filed: Sep. 5, 1986

[51] Int. Cl.⁴ .......................... F16J 15/32; F16J 15/46
[52] U.S. Cl. ......................................... 277/27; 277/24; 277/205; 277/216
[58] Field of Search ............... 277/3, 24, 27, 152, 277/153, 205, 206 R, 212 R, 212 C, 216

[56] References Cited

U.S. PATENT DOCUMENTS

| | | | |
|---|---|---|---|
| 1,871,299 | 8/1932 | Bragg et al. | 277/206 X |
| 2,007,501 | 7/1935 | Millmine | 277/27 X |
| 2,925,290 | 2/1960 | Greenwald . | |
| 2,979,350 | 4/1961 | Lansky | 277/24 |
| 3,273,899 | 9/1966 | Warnery . | |
| 3,575,477 | 4/1971 | Newsome . | |
| 3,643,964 | 2/1972 | Snelling et al. | 277/24 |
| 3,678,809 | 7/1972 | Doutt . | |
| 3,734,580 | 5/1973 | Piscitelli . | |
| 3,881,792 | 5/1975 | Orain . | |
| 3,887,199 | 6/1975 | Sundqvist . | |
| 3,971,566 | 7/1976 | Levinsohn et al. . | |
| 4,082,296 | 4/1978 | Stein . | |
| 4,114,898 | 9/1978 | Bainard et al. . | |
| 4,196,912 | 4/1980 | Quitberg | 277/205 X |
| 4,285,525 | 8/1981 | Held | 277/206 R X |
| 4,350,345 | 9/1982 | Kalan et al. . | |
| 4,556,079 | 12/1985 | Pfeiffer . | |

FOREIGN PATENT DOCUMENTS

| | | | |
|---|---|---|---|
| 2140102 | 11/1984 | United Kingdom | 277/24 |
| 2150232 | 6/1985 | United Kingdom | 277/27 |

Primary Examiner—Robert S. Ward
Attorney, Agent, or Firm—Wells, St. John & Roberts

[57] ABSTRACT

A pressurized bearing seal which uses pressurized air (1) to expand a sealing member which surrounds a shaft supported by the bearing to create a seal between the shaft and bearing, and (2) for an air purge from the bearing along the shaft to prevent intake of foreign particles into the bearing along the shaft. A ring assembly, which is secured to the bearing, surrounds the expandable member and has a conduit formed therein for purging or bleeding pressurized air along the shaft to the atmosphere.

25 Claims, 3 Drawing Sheets

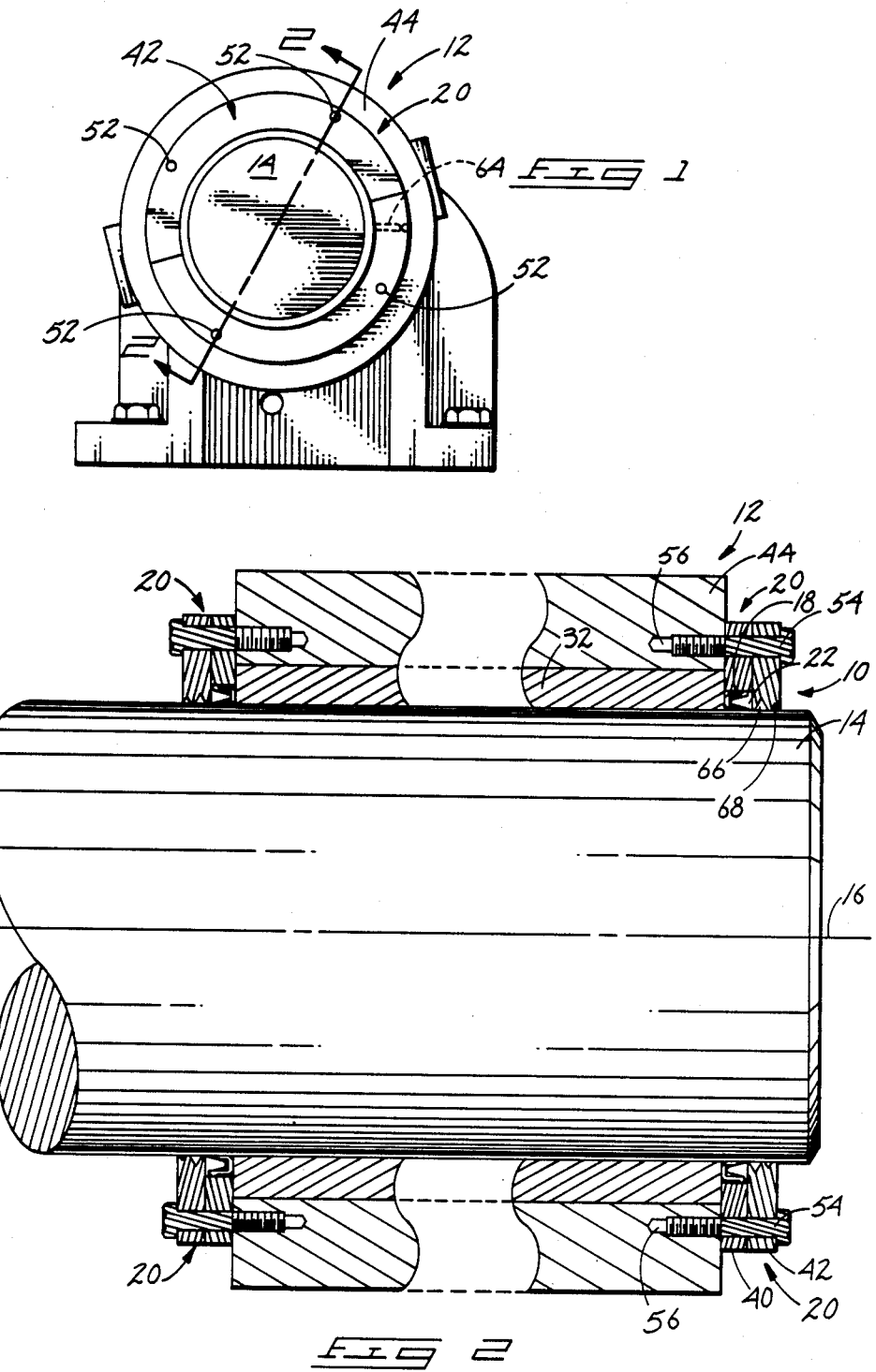

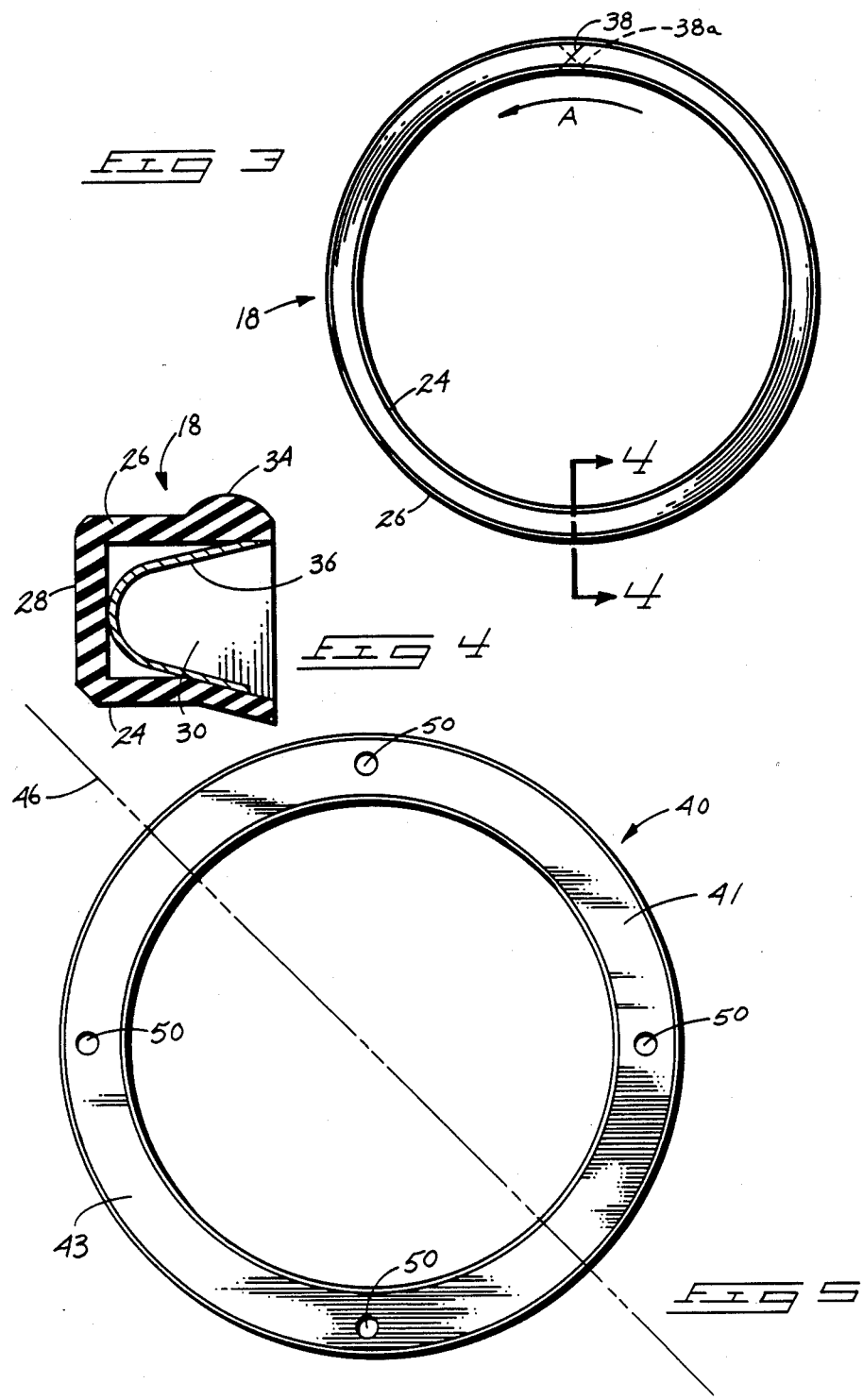

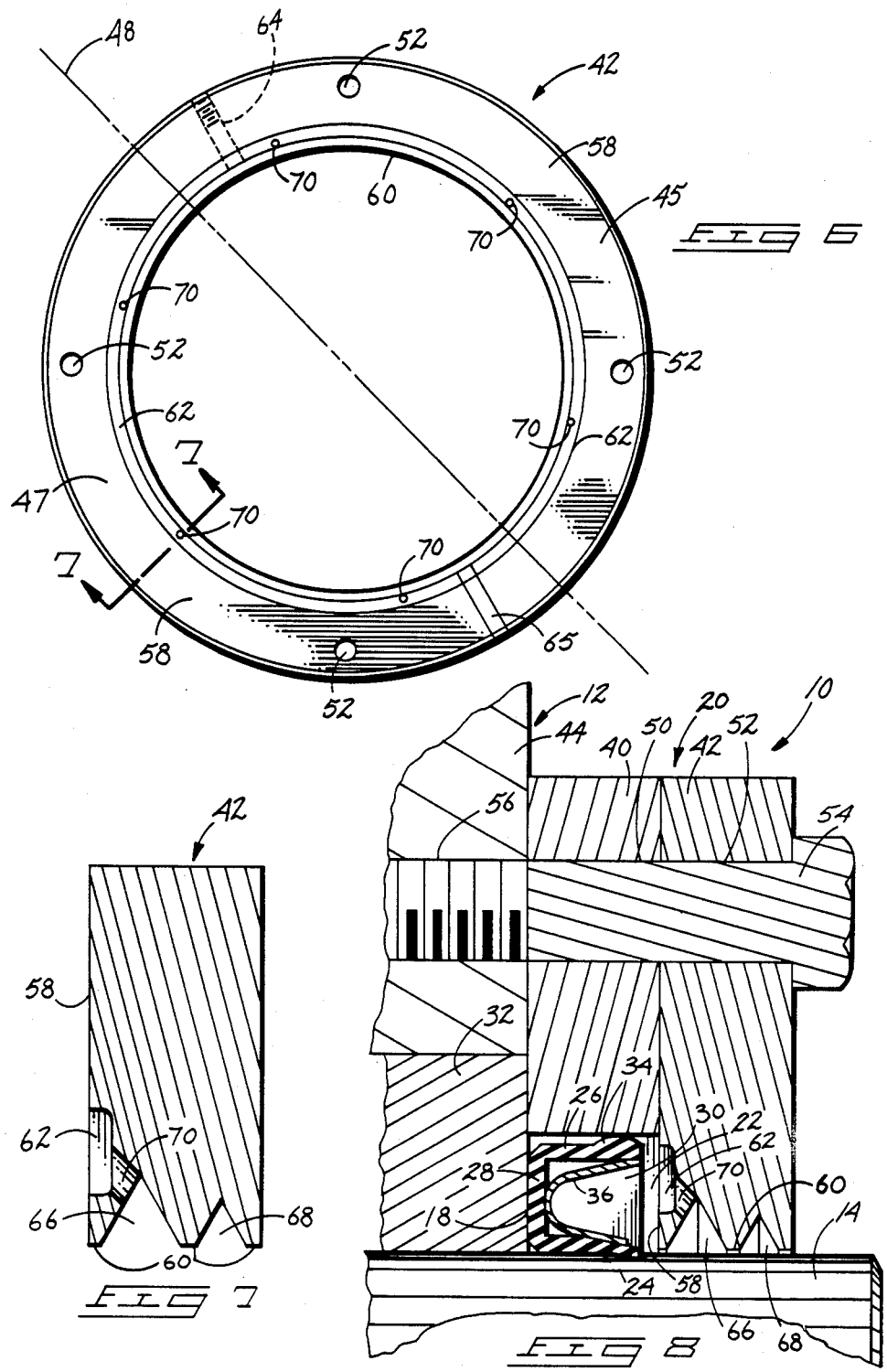

PRESSURIZED BEARING SEAL ASSEMBLY

TECHNICAL FIELD

This invention relates generally to seals for bearings and more particularly to pressurized bearing seals.

BACKGROUND OF THE INVENTION

Bearing seals are used to prevent contaminants from entering the bearing along the shaft. Were contaminants permitted to enter this area, rapid wear of the bearing or shaft would likely result. This causes costly downtime of equipment and significant costs in material and labor in replacing worn parts. Bearing seals are especially useful where bearings are used in very dirty areas where floating particulates are present.

Devices having seals for preventing the ingestion of contaminant along a shaft are well-known in the art, such as for example shown in U.S. Pat. Nos. 3,734,580 to Piscitelli; 3,887,199 to Sundqvist; 4,350,345 to Kalan et al; 3,575,477 to Newsome; 3,273,899 to Warnery; 3,678,809 to Doutt; 4,082,296 to Stein; and 2,925,290 to Greenwald. A number of such patents use pressurized air which is injected into an enlarged portion of the bearing cvaity and forced along the shaft to the atmosphere, thus preventing contaminants from entering the bearing.

For example, U.S. Pat. No. 3,575,477 shows an air purge system in which a portion of air supplied under pressure is utilized as an air purge and lost to the atmosphere as it flows axially between a rotating shaft and bearing housing. Another portion of the air is utilized to moisten a wiper seal. U.S. Pat. No. 3,887,199 describes a seal assembly wherein pressurized air is used to moisten a wiper seal. U.S. Pat. No. 3,887,199 describes a bearing in which pressurized air is bled from the bearing to prevent the intake of contaminants. U.S. Pat. No. 3,734,580 describes a series of notched labyrinth seals for bearings. Pressurized air is forced along the shaft and through the notches, thus preventing contaminant from entering the bearing. U.S. Pat. No. 4,350,345 shows an air seal which directs air axially along the shaft through a pair of deflector rings. Most of the foregoing seal assemblies are fairly complex, expensive, and difficult to manufacture and use.

A number of other such seal assemblies for sealing the space between a shaft or stationary pipe and a stationary support structure which receives the pipe or shaft are shown, for example, in U.S. Pat. Nos. 4,556,079 to Pfeiffer; 3,881,792 to Orain; 4,114,898 to Bainard et al; and 3,971,566 to Levisohn. However, most of these patents disclose seal assemblies whose primary purpose is to prevent escape of oil from the support structure which receives the shaft or pipe.

Accordingly, there remains a need for a pressurized seal assembly for a bearing which is simple and inexpensive to manufacture and operate, yet effective in preventing contaminants from entering a bearing.

BRIEF DESCRIPTION OF THE DRAWINGS

A preferred embodiment of the invention is illustrated in the accompanying drawings, in which:

FIG. 1 is an end view of a dry bearing employing a seal assembly in accordance with the invention;

FIG. 2 is a fragmented longitudinal section view taken along line 2—2 in FIG. 1;

FIG. 3 is an end view of an expandable sealing member used in the seal assembly of FIG. 1;

FIG. 4 is an enlarged section view taken along line 4—4 in FIG. 3.;

FIG. 5 is an end view of a first ring member used in the seal assembly of FIG. 1;

FIG. 6 is an end view of a second ring member used in the seal assembly of FIG. 1;

FIG. 7 is an enlarged section view taken along line 7—7 in FIG. 6;

FIG. 8 is an enlarged view of the seal assembly bearing, and shaft interface as shown in the upper right hand corner in FIG. 2.

DETAILED DESCRIPTION OF A PREFERRED EMBODIMENT

The following disclosure of the invention is submitted in compliance with the constitutional purpose of the Patent Laws "to promote the progress of science and useful arts" (Article 1, Section 8).

Referring to FIGS. 1, 2 and 8, a pressurized seal assembly 10 in accordance with the invention is adapted for mounting at each end of a bearing 12. Reference will be herein made to the seal assembly at the right of the bearing, as shown in FIG. 2.

Bearing 12 rotatably supports a shaft 14 for rotation about an axis 16. Seal assembly 10 includes an expandable member or seal 18 which is adapted to surround shaft 14. Seal 18 includes a cavity means therewithin. A ring means 20, adapted to be secured to bearing 12, surrounds shaft 14 and defines an annular sealing space 22 which is adapted for receiving seal 18. Ring means 20 is connected to a pressurized air source for supplying air under pressure to the cavity means and causing expansion of seal 18. Seal 18 thereby expands inwardly against shaft 14 and outwardly against ring means 20. This sealing expansion provides a first sealing action between rotating shaft 14 and bearing 12.

A conduit means in communication with the cavity means is provided for bleeding pressurized air from the cavity means axially along shaft 14 to prevent contaminants from entering the bearing along shaft 14. This bleeding of pressurized air provides a second sealing action between rotating shaft 14 and bearing 12. Accordingly, air under pressure is used to expand seal 18 to create a friction seal between the shaft and bearing, and to also partially bleed from seal 18 along the shaft to keep contaminant from entering the bearing.

More particularly, referring FIGS. 3, 4, and 8, expandable member or seal 18 is preferably made of a resilient, yet expandable material. Fluorocarbon is an example of such a material which is also stable at high temperatures. Seal 18 is preferably U-shaped, having a first inner annular portion or leg 24 which bears against shaft 14. Expandable member 18 also includes a second outer annular portion or leg 26, opposite first leg 24, which is adapted to sealingly engage a stationary portion of bearing 12 through the ring means 20. Seal 18 is preferably adapted to ride and thereby rotate with shaft 14 and to rub against ring means 20 as the shaft rotates. Second outer leg 26 includes a protuberance 34 formed at the outer end thereof for rubbing against ring means 20. Projection 34 enlarges the thickness of the end of leg 26 making it more wear resistant as seal 18 rubs against ring means 20. A base portion 28 extends between legs 24 and 26 and defines the "U" shape and a central cavity 30 within the "U". Base 28 bears against a stationary annular bushing or liner portion 32 of bearing 12.

Cavity 30, being disposed between first and second opposing legs 24, 26, is adapted for receiving pressurized air and causing respective outward and inward expansion of legs 26, 24 for sealing rotatable shaft 14 with resect to bearing 12. A biasing means, in the form of an annular leaf spring 36 is included within cavity 30 for biasing the end portions of legs 24 and 26 from one another. Spring 36 can be made of stainless steel or any other suitable material. The pressurized air fed through ring means 20 to cavity 30, as more fully described below, combines with spring 36 to bias legs 24 and 26 from one another to effect a good seal between shaft 14 and bearing 12. Best performance is obtained when both air and a spring as shown are used to effect the sealing action. However, air alone might be suitable to effect the biasing and corresponding sealing action.

Seal 18 is formed as a unitary member having an angled slit 38 radially cut therethrough to provide a way of separating the seal and fitting it around shaft 14. Slit 48 is angled left or right at preferably 45° to the perpendicular depending on the direction of shaft rotation with respect to the seal. Best performance is achieved when slit 38 is angled toward the direction of rotation, direction "A" as shown in FIG. 3. A slit 38a, shown in phantom, would be formed for placement of the seal around a shaft where rotation is opposite to that of direction "A". This would be the only difference in FIG. 2 between the seal assembly mounted at the right of the bearing and that mounted at the left. Also preferably, annular leaf spring 36 is formed as a unitary member, the ends of which are positioned to overlap at slit 38.

Referring more particularly to FIGS. 2 and 8, ring means 20 is comprised of a first ring 40 and a second ring 42 which encircles shaft 14. Although shown as separate rings, rings 40 and 42 could be integrally formed.

First ring 40 encircles seal 18 and is adapted to bear against a stationary portion 44 of bearing 12. Second ring 42 is adapted to bear against first ring 40 and thereby be secured to the stationary bearing support structure through first ring 40. First ring 40 has a centrally open diameter which is larger than second ring 42, thereby defining an annular sealing space 22 in which seal 18 is received. Seal 18 is positioned such that the open end of the "U" faces second ring 42 with the outer leg 26 bearing against first ring 40. In this manner, first ring 40 serves to space second ring 42 axially from seal 18 and place second ring 42 in fluid communication with cavity 30.

Referring to FIGS. 5 and 6, rings 40 and 42 are diametrically split along lines 46, 48, respectively. This separates ring 40 into first and second halves 41, 43 and ring 42 into first and second halves 45, 47. The rings are split to provide an easy way of securing the rings around a shaft and to the bearing. Four holes 50 extend laterally through first ring 40 and are aligned with four holes 52 which extend laterally through second ring 42. Holes 50, 52 each receive a bolt 54 which is threaded into a plurality of holes 56 formed in the bearing housing for securing rings 40, 42 to the bearing.

Reference is made to FIGS. 2, 7, and 8 for explanation of a preferred construction of the conduit means for bleeding pressurized air from cavity 30 along shaft 14 to the atmosphere. As shown, the conduit means is integrally formed in second ring 42 with U-shaped seal 18 being open thereto. Second ring 42 includes an inner side surface 58 which bears against first ring 40 and an innermost annular surface 60 which faces rotating shaft 14. An annular recess or channel 62 is formed in inner side surface 58 and opens into sealing space 22 and accordingly cavity 30 of U-shaped seal 18. Channel 62, as shown, is positioned radially outward of innermost annular surface 60.

A radial aperture or hole 64 extends radially inward from the outermost edge of second ring 42 to channel 62. Hole 64 is connected to a pressurized air source for supplying air under pressure to recess 62 and correspondingly cavity 30 of seal member 18 for causing expansion thereof. Channel 62, extending around ring 42, provides uniform pressure of air throughout cavity 30. A radially directed drain channel 65 is also formed in side surface 58 of second ring 42 opposite hole 64 and extends to channel 62. The purpose of channel 65 will be more fully described below.

A passage means, which is part of the conduit means, is formed in second ring 42 and extends from channel 62 to and along innermost annular surface 60. The passage means comprises the following. Innermost annular surface 68 has at least two V-shaped annular grooves formed therein. The grooves could also be other than V-shaped. A first groove 66 closest to channel 62 is radially directed deeper than a second groove 68 furthest from channel 62. A plurality of holes 70, equally spaced around the second ring 42, extends in angular fashion from channel 62 to the adjacent deep groove 66. Holes 70 permit a portion of the pressurized air used to expand seal 18 to flow to first groove 66, along the shaft to second groove 68, and along the shaft to the atmosphere. Holes 70 are sized sufficiently small to enable the pressurized air to cause expansion of seal 18, yet large enough to permit a sufficient flow of air along the shaft to prevent ingress or entry of contaminants along the shaft. Grooves 66, 68 are of different depths to provide an increasing pressure drop axially along inner annular surface 60 to regulate the flow of air along the shaft.

Accordingly, channel 62, holes 70, and grooves 66, 68 provide one embodiment of a conduit means for air bleeding purposes. Other embodiments will also be envisioned by those skilled in the art.

Drain channel 65 in second ring 42 is in communication with channel 62 and accordingly the pressurized air source. It is provided to make a way to purge any contaminants from the bearing which might find their way into the bearing, for example when the bearing is not running and the seal not pressurized. It is sized large enough to permit contaminant to flow therethrough that could not be forced through holes 70 and along shaft 14. Its maximum size is dictated by the size of holes 70 to permit an appropriate flow of air through holes 70 and along shaft 14, yet still expand seal 18. With such an arrangement, the use of 25–35 psi of air produces proper results.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A pressurized seal assembly for a bearing which rotatably supports a shaft for rotation about an axis, comprising:
   an expandable member adapted to surround the rotatable shaft, the expandable member having a first inner annular surface for sealing engagement with the rotatable shaft and a second outer annular surface for sealing engagement with a stationary portion of the bearing;
   cavity means within the expandable member, the cavity means being disposed between the inner and outer annular surfaces for receiving pressurized air and causing respective outward and inward expansion of the outer and inner annular surfaces; and
   conduit means in communication with the cavity means for bleeding pressurized air therefrom axially along the shaft for preventing contaminants from entering the bearing along the shaft.

2. The seal assembly of claim 1 wherein the expandable member is adapted to rotate with the shaft supported by the bearing.

3. The seal assembly of claim 1 wherein the expandable member comprises a U-shaped member open to the conduit means.

4. The seal assembly of claim 3 including biasing means received within the U-shaped member for biasing the legs of the "U" from one another.

5. The seal assembly of claim 1 including ring means for maintaining the expandable member in a sealing relationship with the shaft and the bearing which rotatably supports the shaft, the ring means being adapted to be secured to a stationary bearing support structure.

6. The seal assembly of claim 5 wherein the conduit means is integrally formed in the ring means.

7. The seal assembly of claim 6 wherein the ring means includes an innermost annular surface in communication with the shaft, the conduit means comprising:
   channel means extending annularly around the ring means and being positioned radially outwardly of the innermost annular surface, the channel means being in fluid communication with the cavity means; and
   passage means extending from the channel means to the innermost annular surface for bleeding pressurized air to the atmosphere along the shaft to prevent contaminants from enetering the bearing.

8. The seal assembly of claim 7 wherein the passage means comprises a plurality of holes.

9. The seal assembly of claim 7 wherein the innermost annular surface has a plurality of annular grooves formed therein.

10. The seal assembly of claim 7 wherein the innermost annular surface has at least two annular grooves formed therein, the passage means comprising a plurality of holes extending from the channel means to at least one of the grooves.

11. The seal assembly of claim 10 wherein the grooves are V-shaped and axially spaced, one of the grooves being larger than the other.

12. The seal assembly of claim 5 wherein the ring means comprises first and second rings, the first ring encircling the expandable member and being adapted to bear against a stationary bearing support structure, the second ring being adapted to bear against the first ring, the conduit means being integrally formed in the second ring.

13. A pressurized seal assembly for a bearing which rotatably supports a shaft for rotation about an axis, comprising:
   first ring means for encircling the rotatable shaft and defining a sealing space between the first ring means and the shaft, the first ring means being adapted to be secured to a stationary bearing support structure;
   an expandable member adapted to be received within the sealing space and surround the rotatable shaft, the expandable member having cavity means for receiving pressurized air for causing expansion of the expandable member within the sealing space;
   second ring means for encircling a shaft, the second ring means being adapted to be secured to the stationary bearing support structure through the first ring means whereby the first ring means is positioned between the second ring means and stationary bearing support structure, the second ring means being in fluid communication with the cavity means; and
   conduit means integrally formed in the second ring means for bleeding pressurized air from the cavity means axially along the shaft for preventing contaminant from entering the bearing along the shaft.

14. The seal assembly of claim 13 wherein the first ring means has a larger centrally open diameter than the second ring means;
   and wherein the expandable member is U-shaped with the base of the "U" being adapted to bear against a bearing, the open end of the "U" facing the second ring means, a first leg of the "U" adapted to bear against a shaft, a second leg of the "U" adapted to bear against the first ring means.

15. The seal assembly of claim 13, wherein the conduit means comprises:
   an annular recess formed in an inner side surfce of the second ring means, the annular recess being in communication with the cavity means of the expandable member; and
   means connecting the annular recess to a pressurized air source for supplying air under pressure to the cavity means.

16. The seal assembly of claim 15 wherein the conduit means further includes passage means extending from the annular recess to an inner annular surface of the second ring means for bleeding pressurized air axially along the shaft to the atmosphere.

17. The seal assembly of claim 16 wherein the second ring means includes an innermost annular surface, the innermost annular surface including a plurality of outwardly directed, annularly oriented grooves formed therein, a first groove closest to the annular recess being radially deeper than a second groove further from the recess than the first groove;
   the passage means comprising a plurality of holes extending from the annular recess to the first groove.

18. The seal assembly of claim 14 including biasing means received within the U-shaped member for biasing the legs of the "U" from one another.

19. The seal assembly of claim 18, wherein the biasing means comprises a leaf spring.

20. The seal assembly of claim 14, wherein a portion of the second leg comprises a protruberance.

21. The seal assembly of claim 16 wherein the first ring means has a larger centrally open diameter than the second ring means;

and wherein the expandable member is U-shaped with the base of the "U" being adapted to bear against a bearing, the open end of the "U" open to the annular recess, a first leg of the "U" adapted to bear against a shaft, a second leg of the "U" adapted to bear against the first ring means.

22. The seal assembly of claim 21 including biasing means received within the U-shaped expandable member for biasing the legs of the "U" from one another.

23. A bearing apparatus for rotatably supporting a shaft for rotation about an axis, comprising:
 a bearing support structure;
 an annular bearing member supported by the bearing support structure, the annular bearing member adapted to contact and rotatably support the shaft; and
 a pressurized seal assembly comprising:
 an expandable member adapted to surround the rotatable shaft, the expandable member having a first inner annular surface for sealing engagement with the rotatable shaft and a second outer annular surface for sealing engagement with a stationary portion of the bearing;
 cavity means within the expandable member, the cavity means being disposed between the inner and outer annular surfaces for receiving pressurized air and causing respective outward and inward expansion of the outer and inner annular surfaces; and
 conduit means in communication with the cavity means for bleeding pressurized air therefrom axially along the shaft for preventing contaminant from entering the bearing apparatus along the shaft.

24. The bearing apparatus of claim 23 including ring means for maintaining the expandable member in a sealing relationship with the shaft and the annular bearing member which rotatably supports the shaft, the ring means adapted to be secured to the stationary bearing support structure, the conduit means being integrally formed in the ring means.

25. The bearing apparatus of claim 24 wherein the expandable member is U-shaped, the base of the "U" containing the annular bearing member, the open end of the "U" opening into the conduit means, a first leg of the "U" adapted to bear against the shaft, a second leg of the "U" bearing against the ring means.

* * * * *